Jan. 9, 1934.  K. LANDA  1,942,557
AGRICULTURAL IMPLEMENT
Filed Feb. 2, 1933
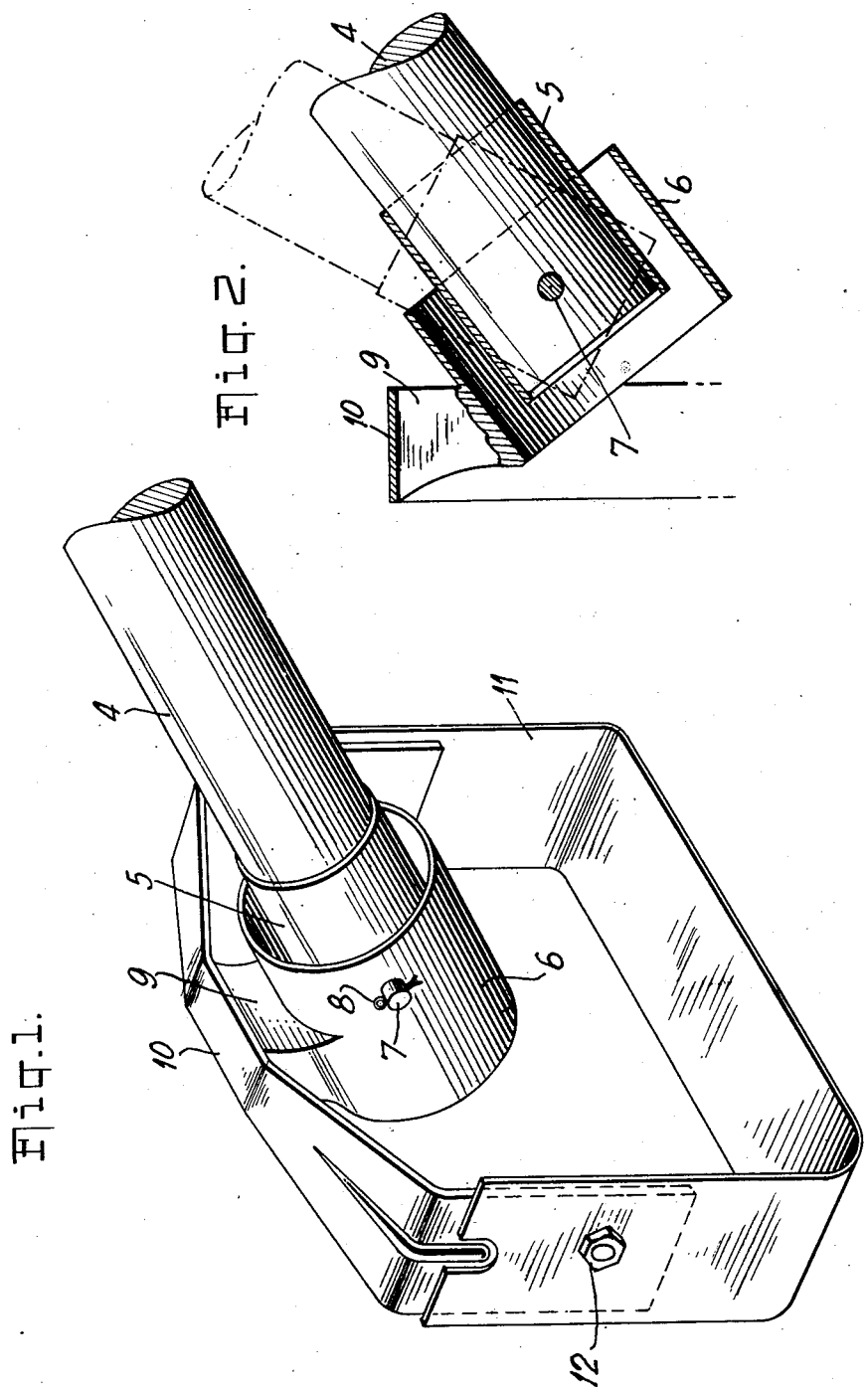
INVENTOR
K. LANDA
BY Oscar A. Geier
ATTORNEY

UNITED STATES PATENT OFFICE 1,942,557

AGRICULTURAL IMPLEMENT

Karl Landa, Landskron, Czechoslovakia

Application February 2, 1933, Serial No. 654,889, and in Czechoslovakia March 25, 1931

1 Claim. (Cl. 306—19)

This invention refers to agricultural implements and relates more particularly to a hoe or a similar instrument used for digging, scraping or loosening earth, uprooting weeds, planting trees, or similar purposes.

An object of this invention is to provide a hoe so constructed that a laborer employing it may have a greater freedom of movement while working, since the hoe may be inclined at any angle with respect to the earth and still remain equally effective in operation.

Another object is to provide a hoe which is equally effective while being moved forwards or backwards, thus eliminating the time and energy wasted by a laborer during the return stroke.

A further object is to provide a hoe having a blade which is automatically adjustable during the course of operation.

The above and other objects of this invention may be realized by providing a hoe having a blade and a handle, the relative positions of which can be changed while the hoe is being operated. The blade swings with respect to the handle while the direction of movement of the hoe is being changed and thus changes the angle at which it inclines, during the change from the forward stroke to the backward stroke and vice versa. Due to this arrangement the laborer is not obliged to raise the hoe from the ground when the backward stroke is completed, but continues to dig the earth during the return stroke.

The invention will appear more clearly from the following detailed description when taken in connection with the accompanying drawing showing a preferred embodiment of the inventive idea.

In the drawing:

Figure 1 is a perspective view of a hoe embodying the principles of this invention.

Figure 2 is a cross-section through the shank of the hoe.

The hoe illustrated in the drawing comprises a handle 4 which is usually made of wood and is secured in a tubular socket 5. A tubular shank 6 which is larger in diameter than the socket 5, surrounds this socket and is connected with it by means of a pin 7 which passes through a hole drilled in the handle 4 and through corresponding openings formed in the walls of the socket 5 and the shank 6, said pin being prevented from falling out of the handle 4 by any suitable means 8. The diameters of the socket 5 and the shank 6 are selected with the view of permitting a range of oscillations of about 20° to 25°, this being the angle between the two extreme positions of the socket 5 or of the shank 6. In Figure 2 the socket 5 oscillates with respect to the shank 6 and can move from the middle position shown in full lines to one of the end positions shown by broken lines. In the end positions the socket 5 is pressed against one of the edges of the shank 6.

The shank 6 carries a connecting member or a projection 9 which is either cast of one piece with the shank, or is firmly connected with it by a welding process. The member 9 is rigidly connected with a U-shaped blade carrier 10 which is supported in the middle by the member 9. As shown in Figure 1, the shank 6 is inclined with respect to the middle portion of the blade carrier 10, the angle of inclination being about 30° or 35°.

The blade 11, which can be of any suitable shape is connected with the blade carrier 10 by means of screws 12, and can be easily replaced by a new one after prolonged use.

The socket 5 assumes the position shown by broken lines in Figure 2 while the hoe is being pulled from left to right, looking in the direction of Figure 2. While the direction of movement of the hoe is being reversed the socket 5 swings to the opposite extreme position and remains in this position while the hoe is being pushed from right to left.

The device illustrated in the drawing may be used for manual labor; it may, however, form a part of a soil cultivating machine, which is driven by horse or motor power.

What is claimed is:

An agricultural implement comprising a tubular shank, a handle socket within said shank, said shank having a larger diameter than said socket, a pin passing through said shank and said socket, a U-shaped blade carrier, and a projection forming a part of said shank and connecting said blade carrier with said shank.

KARL LANDA.